March 11, 1941.  R. D. PIKE  2,234,904

METHOD OF FORMING BEARINGS

Filed Aug. 3, 1931  3 Sheets-Sheet 2

INVENTOR.
Robert D. Pike.
BY Townsend, Loftus & Abbett.
ATTORNEYS.

March 11, 1941. R. D. PIKE 2,234,904
METHOD OF FORMING BEARINGS
Filed Aug. 3, 1931 3 Sheets-Sheet 3
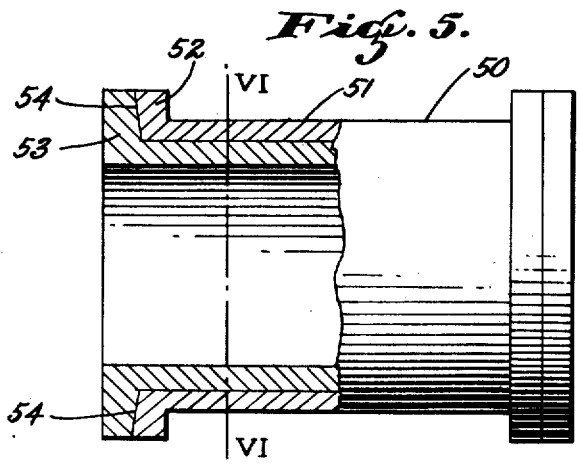
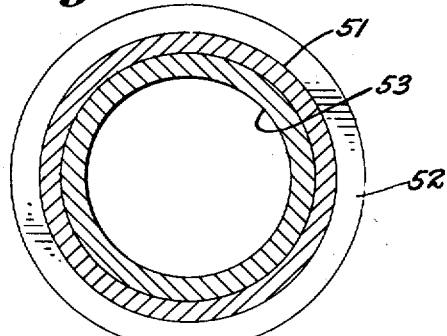
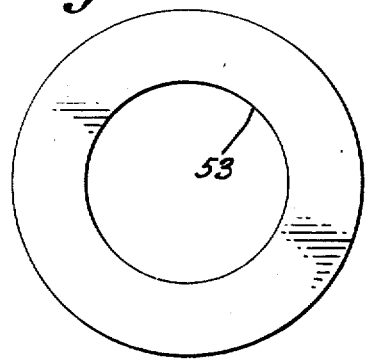
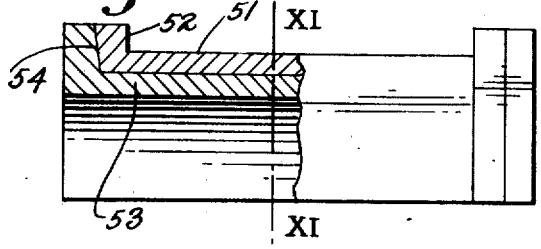
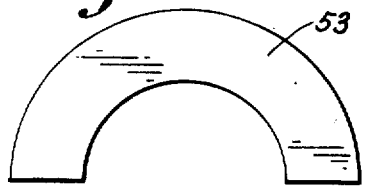
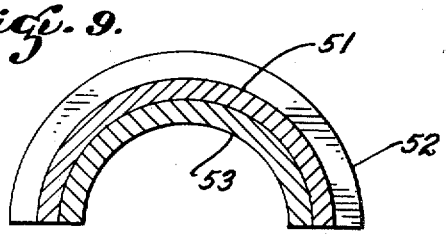
INVENTOR.
Robert D. Pike.
BY Townend, Loftus & Abbett
ATTORNEYS.

Patented Mar. 11, 1941

2,234,904

UNITED STATES PATENT OFFICE 2,234,904

METHOD OF FORMING BEARINGS

Robert D. Pike, Diablo, Calif., assignor, by mesne assignments, to Chas. E. Townsend, Piedmont, Calif.

Application August 3, 1931, Serial No. 554,785

9 Claims. (Cl. 22—204)

The present invention relates to a method for welding or bonding molten metal to the surface of a solid metal. It comprises a novel method for welding dissimilar metals together, and it is applicable for the welding of any metal or mixture of metals or alloy to any metal, or mixture of metals, or alloy, to which it is possible to weld it. For the sake of brevity and clearness of description, any such metal or mixture of metals or alloy will hereinafter be designated broadly by the term "metal."

An object of my invention is to weld or bond a molten metal to a solid metal, the former having a relatively lower melting point than the latter.

A further object is to weld or bond molten copper-base metals such as bronzes of any type to a solid ferrous backing, i. e. iron or steel, in such manner that although the weld or bond is strong and uniform over the entire surface of contact there is virtually no alloying between the copper base metal and the ferrous metal.

A further object of my invention is to weld or bond to a ferrous metal surface a bearing bronze containing principally copper and 20% or more of lead.

An additional object of my invention is to provide a method of bonding plastic bronzes of high lead content to iron or steel backs whereby the lead of the bronze is autogenously repelled from the bond which is virtually between a lead free constituent of the bronze and the back.

An additional object of the invention is to provide a method for welding, to a ferrous or other metal, a metal consisting of copper and as much as, or more than, 35% of lead, and even as much as or more than 40% or 45% or even, 50% of lead, with or without smaller amounts of other elements, said bronzes having inherent microscopic porosity which assists lubrication.

Another object of the invention is to make a very strong bond or union between the two metals.

Another object is to make a firm union between metals having substantially different thermal coefficients of expansion and contraction, so that the union or bond between them will be strong enough to withstand the strains due to the widely different tendencies of the united metals to change in dimensions on changing to a great extent the temperatures to which the article made of the compound metal is subjected.

Another object of the invention is to unite metals having substantially different thermal coefficients of change in dimensions by such a strong bond or union that the union may be effected at high temperatures, for example, the temperature at which the metal is cast in molten condition, and the article may then be cooled down to ordinary room or atmospheric temperatures without overstraining the bond.

Another object of the invention is the production of a bearing or other article of manufacture comprising a supporting backing of strong metal and a facing of metal having the desired bearing characteristics, the bond or union between the metals being so strong that it will resist the heavy stresses and strains to which it is subjected in use or operation.

Another object of the invention is the production of a bearing or other article of manufacture of the type just described wherein failure does not occur in normal operation but only when subjected to stresses and strains far greater than normally occur, as in a testing machine, and then at some place other than the bond or union.

Another object of the invention is the production of a bearing or other article of manufacture of the type described, wherein there will be no hard spots in the bearing face caused by solution of steel from the back or otherwise.

Other objects of the invention will become apparent on reading this specification.

The practice of the invention in its broader aspects is not restricted by the particular analysis of either the solid metal or the molten metal which is to be bonded on it, except that such a relation must exist between the melting points of the two that the solid metal has a sufficient degree of rigidity at the temperature chosen for bonding, and that a flux be chosen having the three necessary requirements, namely:

(1) A high degree of mobility or liquidity at the temperature chosen for pouring the flux;

(2) The property of selective wetting whereby the solid metal is completely and entirely first wetted by the flux with absorption of gas, oxides and other non-metallics from its surface, and then completely and selectively wetted by the poured-in metal to the entire exclusion of the flux from the surface or drying of the surface with respect to the flux; and (3) The further property that after the flux has been repelled from the surface of the solid metal by selective wetting it will be immediately and completely removed from the casting cavity by gravitational displacement without becoming embedded or entrapped in the poured-in metal at or away from the bond.

The process affects bonding by casting a molten metal into a casting space which is bounded by or includes a solid metal to which the molten metal is to be bonded and differs from hitherto known processes of bonding or welding, in that no intermediate metal need be used for effecting a bond between the solid and liquid metal, in that the casting space is first filled with an oxygen and oxide absorbing and/or excluding flux, which is displaced by the poured-in metal by selective wetting and by gravity, and which insures a perfect metal to metal bond between the solid and poured-in metal; and it has been found most desirable that the back to which the poured-in metal is to be welded be at a temperature considerably below the welding temperature, that the molten metal be superheated only to the moderate amount usual in ordinary foundry practice and that the additional heat necessary for producing welding conditions on the surface of the solid metal be furnished by pouring the flux into the casting space in a highly superheated condition, and that as soon as the poured-in metal of a copper-lead bearing begins to solidify that it be drastically chilled by suitable means such as a water spray.

This process is particularly suited to the manufacture of steel-back bearings and the like having a bearing face of a high-lead bronze, because the bond between the bronze and steel is so strong as not to be disrupted to the least extent by the marked difference in the coefficient of thermal expansion (or contraction) between the two metals; because the content of iron in the bearing bronze or metal may be controlled and regulated thereby, whereby the bearing bronze or metal, even as little as .010" away from the weld, can be made virutally free from iron when desired; and because lead, where its presence would cause physical weakness, is repelled away from the bond towards the bearing surface where it is useful, and because of such other reasons as will be apparent to one skilled in the art practicing the invention.

The invention is very well adapted for the application of a facing metal onto a backing metal, said facing usually being comparatively thin, depending upon the purposes for which it is to be used, although the invention is applicable to the manufacture of pieces of metal consisting of two different parts, each of any desired thickness, and firmly, integrally and uniformly joined or welded together at their inter-face.

Various metals may be used for either the facing material or for the backing material, and they may be suitably joined and united into an integral piece by the novel method, it being understood, of course, that the method is better applicable to some metals than to others. For purposes of illustration only and not as a limitation of the invention, except as specifically set forth in the appended claims, the invention will be described as applied to the manufacture of bearings comprising a supporting backing member of mild steel to which a facing layer consisting essentially of about 70 parts of copper and 30 parts of lead, these parts being by weight, is integrally, uniformly and firmly united and joined to the steel backing directly and without any intermediate layer there-between, it being understood that the process to be particularly described as applying to the above copper-lead alloy is equally applicable with minor modifications to any of the other metals hereinafter mentioned. Many bearings of the type described made by my process consist of an iron or steel backing having thereon a bronze metal facing ("bronze" including the type of metal just described), which facing may be of any suitable composition; as, for example, it may contain about 70% to 75% of copper, the balance being of lead, with or without, say, less than ½ of 1% of the other elements, either present as impurities or intentionally present; or such metal may consist of 25% to 40% of lead, 0% to 5% of tin, and the balance copper, there being two series of this metal, one with and one without tin, the plastic bronzes including the series containing tin.

The invention is of application generally in uniting metal of one kind to metal of another kind, and while, as stated above, in view of the strength thereof, the solid metal onto which the molten metal is cast, is generally preferred to be iron or steel yet it may be any suitable metal containing or not containing any of the specific elements herein mentioned. Likewise, the cast metal may be any desired but the invention is more specifically applicable for uniting to iron or steel metals of the lead-copper type where the proportion of copper to lead is less than about two and a half to one by weight with or without the presence of small amounts of other elements; but this proportion may vary in both directions over a wide range.

A table is here given showing some, but not all, of the different metals that may be used for casting, and as stated above, preferably onto a solid ferrous backing.

| Example | Percent copper | Percent tin | Percent nickel | Percent lead |
|---|---|---|---|---|
| #1 | 70 | 0 | 0 | 30 |
| #2 | 60 | | | 40 |
| #3 | 72 | 6 | 0 | 22 |
| #4 | 70 | 4 | 2 | 24 |
| #5 | 68.5 | 4.5 | 0.1 | 26.9 |
| #6 | 69.0 | 0 | 1 | 30 |
| #7 | 68 | 0 | 2 | 30 |
| #8 | 67.9 | 2 | 0.1 | 30 |
| #9 | 78.9 | 1 | 0.1 | 30 |
| #10 | 66.9 | 3 | 0.1 | 30 |
| #11 | 65.9 | 4 | 0.1 | 30 |
| #12 | 80 | 10 | 0 | [1] 10 |
| #13 | 88 | 10 | {0, 2% zinc} | [2] 0 |

[1] A phosphor bronze.
[2] Gun metal.

No attempt is here made to set forth in detail a complete list of metals that may be used successfully in the process of the invention. Variations in any of the above mentioned metals may be made and the process may be applied thereto successfully, even when the lead content of the cupriferous metal is as high as 45% or more, and the use of such high-lead metals with production of a fine grained bearing metal is made possible by rapid drastic chilling as hereinafter described. Metals consisting of 40% of lead and 60% of copper, and of 45% of lead and 55% of copper, and of 50% of lead and 50% of copper may be cast onto iron and steel to form a very strong integral union or bond between them, a result not hitherto attainable.

For making bearings, it is generally preferred that the backing metal be sufficiently strong, and for this purpose iron or steel is preferred.

Referring to the drawings which form a part of this specification:

Fig. 4 is a photomicrograph showing on an enlarged scale a metal consisting of 72% of copper and 28% of lead bonded to a backing of mild steel.

Fig. 5 is a view partially in section and partially in elevation of a full-round bearing.

Fig. 6 is a section on the line VI—VI of Fig. 5.

Fig. 7 is an end view thereof.

Fig. 8 is a view similar to Fig. 5, of a half-round bearing.

Fig. 9 is a section on line IX—IX of Fig. 8.

Fig. 10 is an end view thereof.

Figure 1:
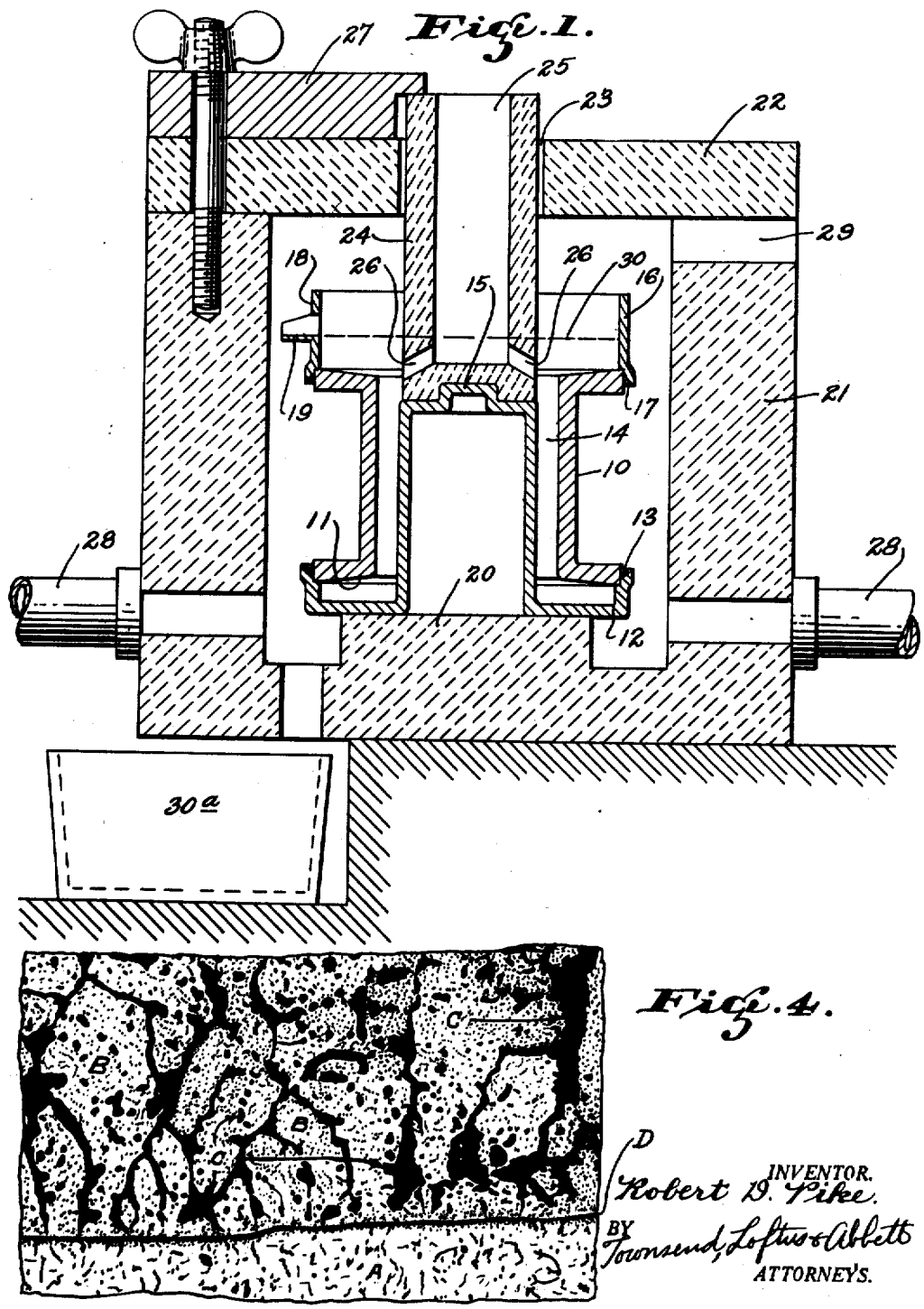
Fig. 1 is a diagrammatic view of apparatus which may be used in making a flanged bearing of the type described.

In the drawings, 10 is a bearing back preferably made of mild steel. The back is illustrated as being flanged, although it will become apparent on further reading that the invention is applicable to the manufacture of bearings which are not provided with flanges. It is preferred that the lower face of the lower flange of the backing member, as it appears on Fig. 1, be not truly horizontal to permit the flux to flow free therepast and therefrom as it is displaced by the molten metal. This may be accomplished variously, and for this purpose it is preferable to provide the flanges with a slight taper 11 to cause the flux to flow. In reality, as will appear later, this taper is only useful on the bottom flange but it is preferable to provide it on both so that bottom may not be confused for top in making the assembly. The bottom of the bearing is closed by a cupped steel piece 12 which is welded to the back at 13.

The object of this procedure is to establish the bottom and the principal inside boundaries of the casting space 14, and it will be obvious to those skilled in the art that any suitable equivalent method may be employed which will hold tight without leakage during subsequent steps of the process. The cup 12 is furnished with the center boss 15. A short cylinder of sheet metal 16 is attached to the top of the back by welding at the edge 17. Overflow hole 18 and spillway 19 are provided. When thus arranged, the back is placed on the platform 20 centrally in the furnace 21. The cover 22 having the central hole 23 is put over the furnace. The core 24 is now inserted through hole 23 into the back set-up and centered by slipping over boss 15. The core 24 is preferably made out of a hard burned mixture of fire clay and sand. The exact mixture will vary with the materials available but I have found a suitable mixture to be equal parts of German clay, brick dust, high silica sand and fire clay. This is molded as dry as possible and then is fired at a temperature of about 1050° to 1350° C. so as to have a semi-vitreous structure. This type of structure is resistant to erosion by the flux and is also relatively easy to remove. Almost any refractory ceramic body, however, may be employed which is relatively resistant to the molten flux. It is provided with a central gate 25 and side gates 26. It is held in place by the holder 27. The furnace is provided with fuel burners 28 or other suitable heating means, and flue outlet 29.

The arrangement illustrated in Fig. 1 contemplates that the backs shall be heated in place in the furnace and while still in place first the superheated flux and then the metal shall be poured. The cover of the furnace would then be removed, the hot casting lifted out and put into position for quenching. In producing large quantities of bearings, however, it has been found preferable to heat the back core set up in a separate furnace, such as an electric furnace, then to remove it to a convenient station for casting flux and metal and then again to remove it to a convenient station for quenching. Before the metal is poured, the casting space is filled, as stated, with a highly superheated flux which has the property in the first place of dissolving from the surface of the steel back all trace of oxides and gases. When the metal is poured into the casting space it accumulates beneath the flux and the latter effectively excludes oxygen, and in fact, everything which would tend to prevent a practically perfect bond, from the casting space during the period of pouring.

Even the least trace of mechanically trapped flux will ruin the anti-frictional property of the bearing. The addition of 10% of cryolite to borax effects a sharp reduction in the melting point of the flux and a considerable increase in its fluidity, and by its use it is possible to effect a perfect mechanical separation between the flux and the poured-in metal by gravitational displacement. A practical form of flux is, therefore,

| | Per cent |
|---|---|
| Anhydrous borax | 90 |
| Cryolite | 10 |

Furthermore, the addition of 10% boric acid makes the flux a better solvent for iron oxide and also less corrosive toward ceramic materials. A preferred form of flux is, therefore,

| | Per cent |
|---|---|
| Anhydrous borax | 80 |
| Cryolite | 10 |
| Boric acid | 10 |

Borax is chosen as the base, because of its low melting point. It will, of course, be understood that anhydrous borax is referred to because the ordinary commercial compound contains water of crystallization which is expelled when it is melted. Pure molten anhydrous borax has good properties of selective wetting as explained above, but its property of mechanical release by gravitational displacement is poor and in the example illustrated in Fig. 1 if pure borax were employed as the flux, it would be impossible to produce a casting free from mechanically trapped borax, particularly in the vicinity of the bottom flange.

It should be understood, however, that any analysis of flux which answers the requirements which have been set forth may be used, and that the use of different metals may make changes in the flux desirable.

The steel back, having been preheated so that it will be at a temperature of about 750° to 850° or 900° C., highly superheated flux of the type described is poured into the casting space at a temperature of about 1400° to 1500° C., which is far above its melting point of about 600° C., at which temperatures the flux is white hot and very fluid. The flux is poured in until it overflows and the metal subsequently poured in is brought to the same level. The flux not only wets the steel back easily at such temperatures but cleanses it of oxides and occluded gases, as well as raising its temperature to the welding point and it also is easily displaced and completely removed from the steel surface by the molten bronze because of its high temperature. There is accordingly a phenomenon in which the flux is involved which may be designated "selective wetting."

The best temperatures of the molten metals for casting may vary with their composition and may be determined by test, but the bronze of the type described we find that excellent results are obtained when the molten metal is at a temperature of 1100° to 1200° C.

It is desired that the flux poured in raise the temperature of the inside surface of the steel back, to a bonding temperature, i. e. around 1050° C., and the temperature to which the steel back is preheated may be varied with this in view since the temperature resulting after pouring in the flux will vary not only with the temperatures to which the different elements referred to are preheated, but also with the amount of metal and heat conductivity of the set-up as well as by the heat radiated therefrom and possibly also with other factors. At temperatures 950° to 1000° C. and higher the flux dissolves all the oxide from the surfaces of the steel with which it comes into contact and removes occluded gases as well, so that the steel surface is clean.

As soon as the face of the back has reached the desired temperature due to contact with the superheated flux, which is usually from fifteen to forty-five seconds after pouring the flux, the lead-bronze is poured in, thus completely removing the flux by selective wetting and gravitational displacement. The flux runs out over spillway 19 and drops into receptacle 30a, whence it may be recovered and used over again. The level 30 is so chosen that there is enough storage of molten metal in the gate 25 and in the casting space 14 above the back that the casting is fed with molten metal as it contracts upon solidification. The poured-in metal descends in a number of streams downwardly through the superheated flux and collects in a pool on the bottom wetting the back with preference to the flux and completely displacing the latter by gravity from the casting space. As the molten metal passes downwardly through the superheated flux in several streams and collects in a pool therebeneath, it is subjected to a beneficent refining action by the highly superheated flux. In fact, the latter affects the surface of the molten metal in a desirable manner by cleansing, much in the same manner as it affects the surface of the steel back; and the general quality of the metal itself is improved. This refining action on the molten metal is made possible by the highly superheated flux and such step in my process is of general usefulness in applying to the refining of metals, it being understood that the temperature of the flux is at a considerably higher level than the temperature of the molten metal.

With bronze of the type described, a true bond takes place almost instantaneously, the poured-in metal wetting the backing metal, but all the components of the poured-in metal do not necessarily wet the backing metal, since in the case of high-lead copper-lead metals or bronzes there is a further selective action, in that the back is wetted by the copper or by the copper-tin or copper-tin-nickel constituent and the lead constituent is actually slightly repelled from the bond. There seems to be a selective migration in the vicinity of the bond, since at the interface there is a layer of copper against the steel, or copper-tin metal if tin is present, just behind which there is a stratum or layer relatively rich in lead, that is, richer in lead than is the metal cast. I refer to this novel phenomena as an autogenous separation from the copper-lead alloy of a thin layer of lead-free material which effects a braze or bond between the main body of the copper-lead alloy and the steel. This braze union is exceedingly strong and its nature and presence accounts largely for the indestructible bond which characterizes bearings made by the present process.

The next step in the process is the drastic chilling of the casting, which is removed from the furnace as soon as cast; and when the metal begins to solidify it is drastically quenched by a water spray applied uniformly to the outside surface of the cast-weld unit until steam is no longer produced. Thus, the entire cast-weld unit is quenched from a bright yellow heat to black in a few seconds and it is obvious that if the bond between the steel back and the poured-in metal were not very strong and perfectly uniform, it would be disrupted by the severe differential temperature strains which are inevitably set up. I have found that this treatment results in a very fine grained bearing metal entirely free from microscopic segregation of lead. I have further found that by virtue of this drastic method of chilling the phenomena of lead repulsion from the bond is accentuated and also that it is possible to make castings containing 45% of lead or more without macroscopic lead segregation, a result which has hitherto been obtained in practice only by the use of additions of sulphur to the melt.

It will be obvious that possible variations in analysis of the molten alloy are endless, but I have found no variation of a high leaded bronze analysis which materially affects the nature of my process except with regard to the rate of chilling. The more tin and/or nickel present the more time may be allowed to elapse before applying the spray and the less drastic may the spraying be without running the danger of there being macroscopic lead segregation.

Incidentally, the drastic quenching of the casting in this manner from a temperature ranging from 800° to 1000° C., is an extremely severe test of the strength of the bond because the copper base alloys have almost twice the coefficient of thermal expansion as steel, and if the bond were not of extraordinary strength, it would be completely disrupted by this treatment. In practice, however, the bond never fails and is always uniform, and this feature combined with the fine grained nature of the high lead bronze and its freedom from injurious impurities gives to bearings made by the present process an incomparable value. It has been found, further, that no matter how large the bearing is, no cracks ever occur in the bronze or in the bond, and bearings as large as ten inches in diameter have been successively manufactured in which the differential contraction of the bronze relative to the steel is about one-quarter inch in the circumference, without developing a crack or separation either in the bronze or the bond.

This strength of the bond and freedom from cracks in large bearings which at first glance seems contrary to natural law may perhaps be explained by the process of selective wetting and by the microscopic nature of the bond as illustrated in the photomicrograph of Fig. 4, as follows:

As the bronze cools and passes the freezing point, lead rich mixtures and finally lead itself separate out, but at this juncture again a selective process makes itself felt because the back is more strongly wetted by copper, or alloys of copper and tin or copper and nickel, free from lead, than by lead or lead rich alloys, and the bond is so strong in the first place that the latter are actually forced or squeezed away from it and out of the layer of lead free material which adhered to the steel back. Thus, by a second selective wetting process, which is autogenous, the back becomes "wet" with respect to lead-free metal and "dry" with respect to lead. The considerable molecular forces necessary to bring this about can only be brought into play under the novel conditions of my process which makes a uniform bond of extraordinary strength between the steel and the molten bronze. The novel result is virtually as though a third and stronger metal had been withdrawn from the leaded bronze and autogenously employed for bonding the two metals together. The bond so made is so strong that no amount of physical deformation of the back will affect it and it will stand the continuous and severe vibration encountered in heavy duty gasoline and Diesel engine main and connecting rod bearings for indefinite periods; nor is it affected by the elevated temperatures which may be encountered in the most severe engine bearing service, and when strained for testing purposes to the breaking point the failure is not at the bond but at the relatively lead-rich layer behind the bond.

Although the principal important use of my process, thus far developed, is for welding bearing bronzes of the high lead type onto ferrous metals such as iron and steel as described, it is useful for other applications of endless variety. For example, it may be employed in pumps, valves, etc. for putting a non-corrodible surface onto steel.

Figure 2:
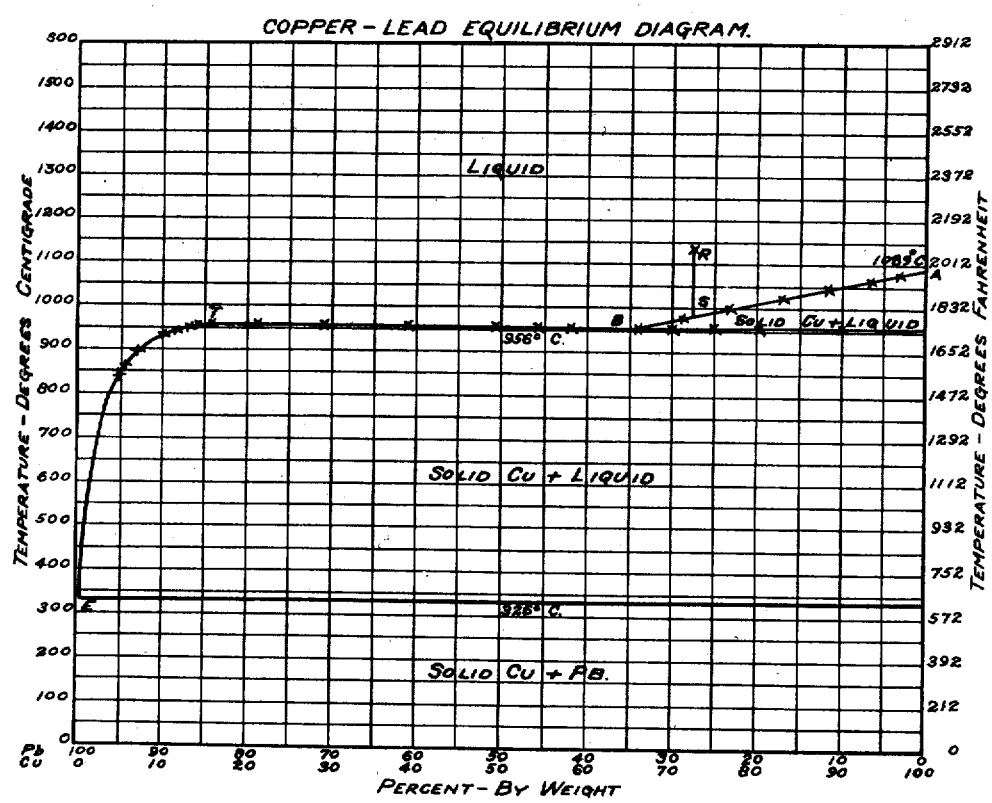
Fig. 2 is a copper-lead equilibrium diagram.
Figure 3:
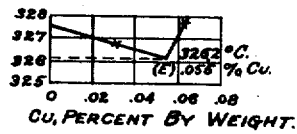
Fig. 3 is an enlargement of a portion of Fig. 2.

In Figs. 2 and 3, which are equilibrium diagrams of metal mixtures consisting of copper and lead in varying proportions from all copper to all lead, there is indicated a curve which applies specifically to metal consisting entirely of copper and lead. The curve, as applied to the cooling of a metal consisting of 28% of lead and 72% of copper will be discussed, but the remarks made thereto will likewise apply to other metal mixtures of the type described. On Figs. 2 and 3 the compositions are indicated as abscissae and the temperatures are indicated as ordinates. I generally cast at aobut 1135° C. and the metal mixture referred to at this temperature is represented by the point R which lies in the area above the line A—B and represents a state in which the copper and lead are molten and completely miscible in each other. As this metal is cooled slowly the point representing the particular metal in question moves along the line R—S to the point S where further cooling will result in freezing part of the mixture, but the solid phase that freezes out is not 28% lead and 72% copper but consists entirely of copper. As the pure copper freezes out, the resulting liquid will become richer in lead, and as the metal is cooled the temperature is further lowered and the point representing the state of the metal moves along the line S—B to the point B. At the point B a further cooling of the metal does not result in a lower temperature, but only in freezing out more pure copper, and as this takes place the composition of the liquid phase becomes still richer in lead and the point representing the metal moves along the line B—T to the point T. At this point the same process takes place as happened at the point S. Further cooling both freezes out pure copper and also lowers the temperature, and this continues as the point proceeds along the curve T—E until the point E is reached, at which point the entire mass becomes solid.

Fig. 3 illustrates more clearly what takes place at point E and the composition at the point E is 0.055% copper and the temperature 326.2° C. This means that a solid phase formed at a temperature just below 326.2° C. consists of a mixture of pure copper which has been freezing out since the point S was passed and a eutectic of 99.945% lead and 0.055% copper.

If the copper freezes out of the mixture over a long period of time, large copper crystals are built up and lead separates out and a fine-grained homogeneous mixture in the metal is impossible. In order to obtain such a fine grained homogeneous mixture, the molten metal is not allowed to cool slowly, but it is chilled drastically by water quenching, which causes a quick fine precipitation of copper which encloses the lead (such lead containing 0.055% of copper) in a very finely divided state. However, there are always some gases dissolved in the molten copper-lead mixture, and quenching the metal from a temperature of 1135° C. would trap all of these gases and result in a swelled or porous bearing layer. Therefore, to allow as much of these gases to escape as possible, quenching is not begun until the metal has cooled slowly to the point S, as shown on Fig. 3. It is at the point S that drastic quenching is best started. When quenching is begun, any gases remaining in the metal are entrapped by back pressure much the same as a bottle of mineral water is corked and this prevents the remaining gases from making the metal porous.

An examination of the copper-iron and lead-iron binary systems shows that copper and iron are miscible each in the other when molten and that iron and lead are immiscible each in the other in any condition. Copper-lead bronzes, particularly those used in the manufacture of bearings, contain the copper and lead, at room temperatures not in the form of an alloy but each as such, and in the present process advantage is taken of such phenomena in the making of a strong bond. As a matter of fact, all photomicrographs of unions between steel and copper-lead metals made by this process show that there is always a thin band of copper of the order of one-half to one thousandth of an inch directly against the steel with the lead stringers and globular particles practically never in actual contact with the steel.

Referring to Fig. 4, the steel backing is indicated as A, the copper being indicated as B and the lead-copper eutectic containing 0.055% of copper being indicated as C, the lead appearing as black spots or stringers surrounding or surrounded by the copper. The weld is very tight, the copper-lead body even filling the infinitesimal contours of the steel and a copper layer of more or less irregular thickness appears all the way along the face of the bond.

The black line D dividing the cast metal from the backing is not indicative of any metallic substance, but it is a result of polishing due to the fact that a step or difference in level between the cast metal and the backing is caused by the difference in hardness in the two metals so that one is ground off more than the other by polishing, and this difference in level casts a shadow which photographs as a black line at the weld.

I have discovered that pure alloys of copper and lead, particularly those containing 35% or more lead have an inherent microscopic porosity amounting to as much as 3% or 4% of the total volume. This factor makes the 60–40 copper-lead alloy of great and unique value in my process where the steel back gives it ample strength. The fine pores in the bearing tend to absorb oil which aids in lubrication.

The phenomena of autogenous repulsion of the lead from the bond, which is a novel feature of this process, results largely from perfect and uniform selective wetting of the back by the copper constituent of the poured-in metal. This in turn means a perfect and uniform bond which depends largely upon the use of a highly superheated flux. The flux in the white hot superheated condition has a novel effect on the steel surface in preparing it for a perfect and instantaneously formed bond. I have found that such an effect is not to be obtained if the flux is poured at ordinary high superheats, say around 1100° C., nor is it obtained by placing the flux in the casting cavity and heating the set up to around 1050° C. before pouring the metal. Not only does the highly superheated flux, when poured at about 1450° C. into a back at around 800° C.-900° C., place the surface of the back in an ideal condition for bonding, but also the flux, by virtue of its poor conductivity for heat, loses temperature very slowly, so that it is still much hotter than the metal when the latter is poured. It is, therefore, to be expected that it has a like beneficial surface effect upon the poured-in metal which promotes bonding and all around soundness of metallic structure. At any rate, it is a fact that perfect results may be uniformly obtained with the use of highly superheated flux as described both with respect to the bond and the bronze itself, while the results obtained otherwise are non-uniform and imperfect, the bond being weak or non-uniform, and the bronze showing porosity or lead segregation or both. Furthermore, by virtue of its high temperature, the flux is extremely mobile when the metal is poured which results in it freeing itself perfectly from the casting cavity—a result not attainable if the flux is not highly superheated.

Drastic chilling of the casting as described also has a novel effect in promoting repulsion of lead from the bond. It is as though a sudden and very severe tension is set up in the copper which is immediately adjacent the bond, which effectively squeezes the lead away from the bond. Thus, a step in my process which would inevitably break the bond were it weak actually strengthens it and this is equally true no matter whether the lead content be as high as 30% or in higher concentration.

In casting leaded bronzes of the described type of steel backs, the casting space should best be not less than 1/16 inch in thickness, although good commercial results are obtainable when it is 1/4 inch. For good commercial working of the process, at least 1/4 inch or more is usually preferred; and if the cast bearing is too thick for the purpose desired, it can be machined down. This is usually the case as the thickness of the bearing metal when finished does not usually exceed 3/32- 1/16 inches. Suitable casts of such metal can be made when the casting space is more than 1/16 inch thick, and it is best not to go below the minimum referred to, since flux may be trapped. For long castings, say those over 12 inches long, it is well to increase the thickness of the casting space somewhat.

Many different kinds of articles may be made by the present process, such articles comprising different metals cast-welded together and having an integral unitary bond between them of such great strength as to resist the various stresses and strains to which they may be subjected in operation or in use, such articles being new due to the type and great strength of such bond. Bearings, crosshead slippers and crown brass type bearings, these articles comprising a steel backing for strength to which there is intimately joined a bearing metal having a high lead content, are some of the new articles of manufacture which can be made according to the invention.

Referring to Figs. 5 to 10 inclusive, a steel member 50, having a cylindrical portion 51 and end flanges 52, is used as a backing to which the bearing metal 53 is integrally and strongly united, as by the process specifically described above. Any good strong iron or steel may be used as the material for the backing, but for many purposes a mild steel is preferred, as is a bearing metal, the major portion of which consists of copper but having a high percentage of lead therein either with or without small amounts of other metals as above described. This metal preferably consists of 25 to 40 parts by weight of lead and 60 to 75 parts by weight of copper either with or without small amounts of such other metals therein.

For certain purposes, however, we prefer a metal consisting of 40 to 45 parts by weight or sometimes even more of lead and 55 to 60 parts by weight of copper either with or without such other metals. It is, of course, understood that any proportion of lead to copper may be used that will be found desirable or useful, the preferred materials and proportions being stated merely as examples.

The tapered interface between the steel and the bronze is shown at 54, such tapered interface being provided for the reasons hereinabove referred to. The bearing may be machined down to proper dimensions after cooling to make a completely finished article. The part-round bearing of Figs. 8, 9 and 10 is essentially the same as the full-round bearing of Figs. 5, 6 and 7, except that it is part-round.

It is, of course, understood that full-round or part-round flangeless bearings may likewise be provided according to the invention.

This application is a continuation-in-part of various applications for Letters Patent of the United States now pending, including: Ser. No. 329,768, "Journal bearing," filed Jan. 2, 1929; Ser. No. 461,707, "Bushing," filed June 17, 1930; Ser. No. 461,709, "Method of welding," filed June 17, 1930.

In the claims, when the word copper-lead alloy is used, it is to be understood that I refer to any of the metals of the general type mentioned in the specifications or to any other thus properly described.

Having thus described my invention, what I claim and desire to secure by Letters Patent is—

1. The method of forming bearings comprising casting within a pre-heated shell a molten substantially uniformly commingled copper lead mixture, and in rapidly cooling from the exterior of said shell to cause a partial segregation of the constituents with a preponderance of copper adjacent to the shell and of the lead adjacent to the inner or bearing surface.

2. The method of forming bearings comprising the casting of a copper lead mixture within a preheated steel shell, in immediately rapidly chilling the exterior surface of said shell and in maintaining the inner surface of the copper lead mixture at a relatively high temperature until the heat is dissipated through the exterior surface of the shell.

3. The method of forming bearings comprising casting a copper lead mixture in a pre-heated steel shell and in subsequently rapidly chilling the exterior surface only of said shell.

4. The method of forming bearings comprising the casting of a copper lead compound having a lead content from 10% to 45% in a pre-heated steel shell and in immediately rapidly chilling the exterior surface of said shell.

5. The method of forming bearings comprising the casting of a copper lead compound having a lead content of between 10% and 45% in a steel shell pre-heated to a temperature from 1900 to 2000° F., the temperature of the molten metal when introduced into the shell being between 1850 and 1950° F., and in immediately rapidly chilling the exterior surface of the shell.

6. The method of forming bearings comprising the casting of a copper lead compound having a lead content of from 10% to 45% in a pre-heated steel shell and in immediately subjecting the external surface of said shell to an atomized spray of the air and water to rapidly chill the same.

7. The process of making a bearing which consists in providing a mold having an outer annular ferrous metal part and a central core whereby an annular space is formed between the two, heating said mold to a temperature approximately that of the melting point of bronze, pouring molten bronze into the annular space aforesaid, cooling said mold and bronze rapidly and from the outside inwardly and toward the center thereof from the temperature immediately after pouring at which the bronze is liquid, to a temperature below that at which the bronze becomes solid, and finally finishing the outside of said outer part and the inside of said bronze bearing metal to the form and size of a finished bearing.

8. The method of forming bearings comprising casting within a pre-heated steel shell a molten substantially uniformly commingled copper lead mixture, and in rapidly cooling from the exterior of said shell to cause a partial segregation of the constituents with a preponderance of copper adjacent to the steel shell and of the lead adjacent to the inner or bearing surface.

9. The method of forming bearings comprising casting within a pre-heated steel shell a molten substantially uniformly commingled copper lead mixture having a lead content from 10% to 45%, and in rapidly cooling from the exterior of said shell to cause a partial segregation of the constituents with a preponderance of copper adjacent to the steel shell and of the lead adjacent to the inner or bearing surface.

ROBERT D. PIKE.